(No Model.)
T. SHAW.
APPARATUS FOR PURIFYING WATER FROM AIR IN THE PROCESS OF FREEZING.
No. 490,508.　　　　　　　　　　Patented Jan. 24, 1893.
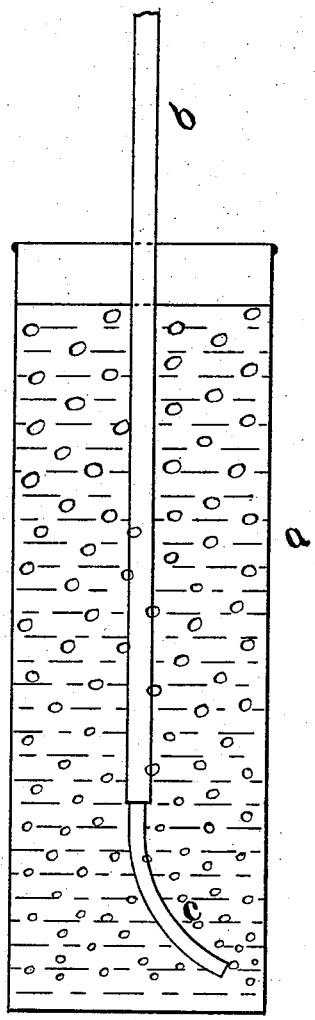
WITNESSES:
C. H. Stevens
Joseph R. Wilson
T. Shaw, M. E.　INVENTOR

UNITED STATES PATENT OFFICE.

THOMAS SHAW, OF PHILADELPHIA, PENNSYLVANIA.

APPARATUS FOR PURIFYING WATER FROM AIR IN THE PROCESS OF FREEZING.

SPECIFICATION forming part of Letters Patent No. 490,508, dated January 24, 1893.

Application filed May 24, 1892. Serial No. 434,131. (No model.)

*To all whom it may concern:*

Be it known that I, THOMAS SHAW, of the city and county of Philadelphia, Pennsylvania, have invented a new and Improved Mode of Purifying Water from Air and Gases in the Process of Manufacturing Ice; and I hereby declare the following to be a full, clear, and exact description of the same, reference being had to the accompanying drawing, and to the letters of reference marked thereon.

My invention consists in the employment of air under pressure and in the employment of a flexible tube. All operating in the manner and for the purpose hereinafter described.

The object of the invention is to cause the production of transparent ice, and is to be operated in connection with the ordinary machinery and apparatus used in the manufacturing of ice.

In order to enable others to use and practice my invention, I will proceed to describe its construction and operation:

On reference to the accompanying drawing, which forms part of the specification, the drawing represents an ordinary metal can *a*, into which the water is to be placed to supply the material necessary for the formation of ice.

*b*, is a rubber tube of about one-fourth inch bore, terminating in a rubber tube of about three-sixteenth inch bore of greater flexibility. The upper end of said tube *b*, is connected by ordinary iron pipes to any source of air pressure (three pounds per square inch is sufficient).

It is well known that in the manufacture of ice the air and gases exuding from the water, form air globules in the ice which give the ice a white and snow-like appearance and injure its commercial value. The purpose of my invention is to remove the said gases in the manner hereinafter explained. The invention is put in operation this wise—

The can or tank *a*, with its supply of fresh water is immersed in the usual freezing mixtures of brine &c., and when the water in the can has arrived at the freezing point, air under pressure is caused to pass down through tube *b*, and pass out of flexible end *c*. The effect of the ejection of air under pressure from the end of flexible tube *c*, is to cause the said tube to vibrate on the end from side to side that may be likened unto a whipping action, which releases the air from the water, while large globules of air absorb the small globules that exude from the water on account of the greater affinity which air, has for air, over which it has for water. The addition of air causes the smaller globules of air to coalesce increasing the diameter sufficient to have the necessary buoyancy to float to top surface of water, and escape to the outer air. Thus performing the seeming paradoxical work of removing air from water by pumping air into water. The mechanical action of large globules of air floating through the water so agitates the water as to wipe off small air globules that adhere to the surface of the ice, while the whipping action of the flexible tube has a similar effect. The rubber tube can be withdrawn from time to time as the process of freezing is nearly completed. The motion of the tube induced by the outflowing air will prevent the tube freezing into the ice, and this motion can be augmented whenever desired by ordinary mechanical appliance arranged to cause vibrations at the upper end of said tube. The introduction of air alone under pressure gives a good result, but it is necessary to have a means of distributing the air to the several sides of said can *a*. The flexible tube *c*, is sufficient to produce a good result, but various mechanical appliances can be substituted therefor to give increased motion if desired with slight modification in the result.

It will be evident that the said device can be variously modified without any alteration in the result. I therefore do not wish to confine myself to the exact configuration and location herein set forth.

What I claim and desire to secure by Letters Patent is—

1. In an ice making apparatus, the combination of the water containing tank or can, a flexible tube extending into the tank near to its bottom, and means for forcing air through such tube under pressure, whereby the flexible tube is caused to vibrate in the body of the liquid contained in the can substantially as set forth.

2. In an ice making apparatus, the combination of the water containing freezing tank or can, the tube $b$ which enters the can provided with the flexible end $c$, and means for forcing air through such tube under pressure, substantially as set forth.

THOMAS SHAW.

Witnesses:
 JOSEPH R. WILSON,
 L. SHUGARD.